United States Patent
Ide

(10) Patent No.: US 7,475,052 B2
(45) Date of Patent: Jan. 6, 2009

(54) MALFUNCTION CONDITION JUDGMENT APPARATUS, CONTROL METHOD, AUTOMOBILE AND PROGRAM METHOD

(75) Inventor: Tsuyoshi Ide, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/443,517

(22) Filed: May 30, 2006

(65) Prior Publication Data

US 2007/0021890 A1    Jan. 25, 2007

(30) Foreign Application Priority Data

May 30, 2005    (JP)    ............... 2005-157496

(51) Int. Cl.
*G06F 9/44* (2006.01)
*G06N 5/02* (2006.01)
*G06N 7/06* (2006.01)

(52) U.S. Cl. ..................................................... 706/52
(58) Field of Classification Search ............... None
See application file for complete search history.

(56) References Cited

U.S. PATENT DOCUMENTS

| | | | | |
|---|---|---|---|---|
| 5,084,826 | A * | 1/1992 | Hariki et al. | 700/248 |
| 5,493,729 | A * | 2/1996 | Nigawara et al. | 706/52 |
| 5,740,028 | A * | 4/1998 | Sugiyama et al. | 725/149 |
| 5,774,759 | A * | 6/1998 | Tanaka | 399/8 |
| 5,828,976 | A * | 10/1998 | Fukuchi et al. | 701/110 |
| 5,838,561 | A * | 11/1998 | Owen | 700/32 |
| 5,988,857 | A * | 11/1999 | Ozawa et al. | 700/213 |
| 6,591,147 | B2 * | 7/2003 | Nakane | 700/29 |
| 6,839,603 | B2 * | 1/2005 | Karasawa | 700/101 |

(Continued)

FOREIGN PATENT DOCUMENTS

JP    PUPA 61025951    5/1986

(Continued)

OTHER PUBLICATIONS

Intelligent flight control: what are the flight programs and why develop this technology? Urnes, J.M., Sr.; Circuits and Systems, 2002. MWSCAS-2002. The 2002 45th Midwest Symposium on vol. 2, Aug. 4-7, 2002 pp. II-135-II-138 vol. 2.*

(Continued)

*Primary Examiner*—Michael B Holmes
(74) *Attorney, Agent, or Firm*—Anne Vachon Dougherty; Shimokaji & Associates, P.C.

(57) ABSTRACT

A malfunction condition judgment apparatus (MCJA) that judges malfunction condition (MC) of an observed object based on a change of observed values. The MCJA acquires time series data for values of each of a plurality of variables; calculates, with respect to each of the variables, a statistic defining a probability density function of that variable at T1, based on the value of that variable at T1 and that statistic at a point of time prior to T1; calculates dissimilarity showing an extent of variation between the statistic calculated for each variable and a statistic of a criterial probability density function predetermined corresponding to that variable; and picks, out of the plurality of variables, a variable for which the calculated dissimilarity is larger than a predetermined reference value, as the variable by which MC of the observation object is detected.

1 Claim, 7 Drawing Sheets

U.S. PATENT DOCUMENTS

| | | | |
|---|---|---|---|
| 7,095,367 B2 * | 8/2006 | Fujikawa et al. | 342/176 |
| 7,215,034 B2 * | 5/2007 | Hino et al. | 290/40 C |
| 7,346,412 B2 * | 3/2008 | Tokorozuki et al. | 700/110 |
| 7,372,399 B2 * | 5/2008 | Fujikawa et al. | 342/176 |

FOREIGN PATENT DOCUMENTS

| | | |
|---|---|---|
| JP | PUPA 05-256741 | 10/1993 |
| JP | PUPA 08-044422 | 2/1995 |
| JP | PUPA 2001-117626 | 4/2001 |
| JP | PUPA 2003-348886 | 12/2003 |
| JP | PUPA 2004078981 | 3/2004 |
| JP | PUPA 2004-295427 | 10/2004 |
| JP | PUPA 2005004658 | 1/2005 |

OTHER PUBLICATIONS

Adaptive fuzzy fault-tolerant controller for aircraft autolanding under failures Hai-Jun Rong; Sundararajan, N.; Saratchandran, P.; Guang-Bin Huang; Aerospace and Electronic Systems, IEEE Transactions on vol. 43, Issue 4, Oct. 2007 pp. 1586-1603 Digital Object Identifier 10.1109/TAES.2007.4441760.*

Diagnostics on electronic control cards in power plants by analog signature analysis method Hoyol Kim; Dooyong Park; Youngjin Shin; Control, Automation and Systems, 2007. ICCAS '07. International Conference on Oct. 17-20, 2007 pp. 2398-2401 Digital Object Identifier 10.1109/ICCAS.2007.4406734.*

Disturbance analysis using a system bond-graph model Kohda, T.; Inoue, K.; Takata, S.; Asama, H.; Reliability and Maintainability Symposium, 1999. Proceedings. Annual Jan. 18-21, 1999 pp. 358-364 Digital Object Identifier 10.1109/RAMS.1999.744144.*

A New Multi-attribute Optimal Selecting Method for Weapon System through Trapezoidal Fuzzy Analytic Hierarchy Process and Delphi Chao Zhang; Cunbao Ma; Zhenbao Liu; Jiadong Xu; Intelligent Control and Automation, 2006. WCICA 2006. The Sixth World Congress on vol. 2, 21-23 pp. 7821-7825 Digital Object Identifier 10.1109/WCICA.2006.1713493.*

* cited by examiner

| | DELTA FUNCTION | NORMAL DISTRIBUTION | UNIFORM DISTRIBUTION | OTHER |
|---|---|---|---|---|
| SKEWNESS | 0 | 0 | 0 | (NON-ZERO) |
| KURTOSIS | 0 | 0 | -6/5 ※ | (NON-ZERO) |

MALFUNCTION CONDITION JUDGMENT APPARATUS, CONTROL METHOD, AUTOMOBILE AND PROGRAM METHOD

FIELD OF THE INVENTION

The present invention relates to a malfunction condition judgment apparatus (hereinafter referred to as MCJA), a control method, an automobile and a program. In particular, the present invention relates to a MCJA, a control method, an automobile and a program that judge malfunction condition (hereinafter MC) having occurred in each of portions of an observation object thereof.

BACKGROUND OF THE INVENTION

In recent years, electronics in automobiles has been strikingly advanced, and a control of an automobile has come to be performed based on packet communication means such as Control Area Network (CAN). If a communications standard such as one described above is established, it becomes possible to obtain a large number of time series data which changes every moment from individual units of an automobile. Since these time series data are obtained as a result of observing operations of the automobile in detail, these data are expected to be applied to operation analysis, MC detection and the like.

Data obtained by CAN have the following characteristics:

1. The data includes an enormous amount of data. In some cases, data may be obtained for hundreds to thousands of variables.

2. In the data, there are contained control signals, and checksum variables used for error detection are mixed among physical variables whose values are set to be observed values such as revolutions and pressure.

3. Data are obtained at a high frequency at time intervals of 10 milliseconds.

As described above, data obtained by CAN are various and enormous. Accordingly, in many cases, an appropriate analysis cannot be performed in a conventional method where MC is found out by an engineer, visually checking a graphed data. On the other hand, inventors of the present invention proposed a technology for judging, on the basis of the same reference variable called a change-point, changing patterns of a plurality of variables whose kinds are different from one another (see T. Ide and K. Inoue: Knowledge Discovery from Heterogeneous Dynamic Systems using Change-point Correlations, in Proc. 2005 SIAM International Conference on Data Mining (SDM 05, Newport Beach, Calif., USA), Apr. 21-23, 2005). This technology makes MC judgment easy by automatically finding out a combination of variables associated with one another.

SUMMARY OF THE INVENTION

However, if the number of variables that are objects of judgment is enormous, an explosion of combinations occurs in some cases, and an enormous amount of time is required for processing the judgment. In these cases, it is impossible to immediately judge MC based on time series data obtained every moment. Furthermore, for the purpose of storing all of time series data obtained from individual portions of an automobile, a storage device having an enormous storage capacity comes to be required. Accordingly, it is preferable that, whenever an observed value is obtained from each of the individual portions of the automobile, merely a variable possible to be used for MC judgment be selected, and merely values of the variable be stored. Note that it is necessary that this selection processing be performed at high speed with a CPU mountable on an automobile and having relatively low computing performance.

Additionally, as one of factors making MC detection of an automobile difficult, impossibility of performing comparative experiments under totally identical conditions can be cited. For example, for the purpose of detecting MC difficult to analyze, an automobile is caused to run on a predetermined test course under a predetermined driving condition. However, even when automobiles are caused to run on a predetermined test course under a predetermined driving condition, there arises dissimilarity between observed values obtained from one individual portion of the automobile due to minute dissimilarity in experimental condition. Accordingly, it is desirable that a variable indicating an occurrence of MC be appropriately selected regardless of the above-described dissimilarity in experimental condition.

Furthermore, as another one of the factors making MC detection of an automobile difficult, difficulty of obtaining detailed information on a design of the automobile can be cited. Because the information on a design of the automobile is one of the most important information for an automobile manufacturing company, the information is, in some cases, confidential not only to those outside the company naturally, but to those inside the company. In these cases, it is often impossible to previously know a range of values held by each of the variables, and meanings of the values. Furthermore, if the automobile is in a development phase or in a modification phase, meanings indicated by the respective variables are frequently changed in many cases. Even in the above-described case where a meaning of each of the variables cannot be previously obtained, it is further preferable that a variable indicating an occurrence of MC be appropriately selected.

Accordingly, an object of this embodiment is to provide a MCJA, a control method, an automobile and a program that are capable of solving the abovementioned problems. This object can be achieved by a combination of characteristics mentioned in independent claims in the scope of claim for patent of the present invention. Dependent claims define further advantageous concrete examples of the present invention.

In order to solve the above-mentioned problems, in the first embodiment of the present invention, a MCJA that judges MC of an observed object based on a change of observed values observed from the observation object, a control method thereof, a program therefor, and the like are provided. The MCJA comprises: an acquiring unit operable to acquire time series data for values of each of a plurality of variables that has a plurality of observed values observed from the observation object as a value; a statistic computing unit operable to calculate, with respect to each of the variables, a statistic defining a probability density function of that variable at a point of time 1 (hereinafter referred to as T1), based on the value of that variable at T1 and that statistic at a point of time prior to T1; a dissimilarity computing unit operable to calculate, with respect to each of the variables, dissimilarity showing an extent of variation between the statistic calculated for that variable and a statistic of a criterial probability density function predetermined corresponding to that variable; and an extracting unit operable to pick up, out of the plurality of variables, a variable in which the calculated dissimilarity is larger than a predetermined reference value, as the variable by which MC of the observation object is detected.

BRIEF DESCRIPTION OF THE DRAWINGS

For a more complete understanding of the present invention and the advantage thereof, reference is now made to the following description taken in conjunction with the accompanying drawings.

DESCRIPTION OF PREFERRED EMBODIMENT

Hereinafter, while the present invention will be described by way of invention embodiment, an embodiment as follows does not limit the invention according to the scope of claim. Additionally, not all of combinations of characteristics described in the embodiment are essential in solving means of the invention.

Figure 1:
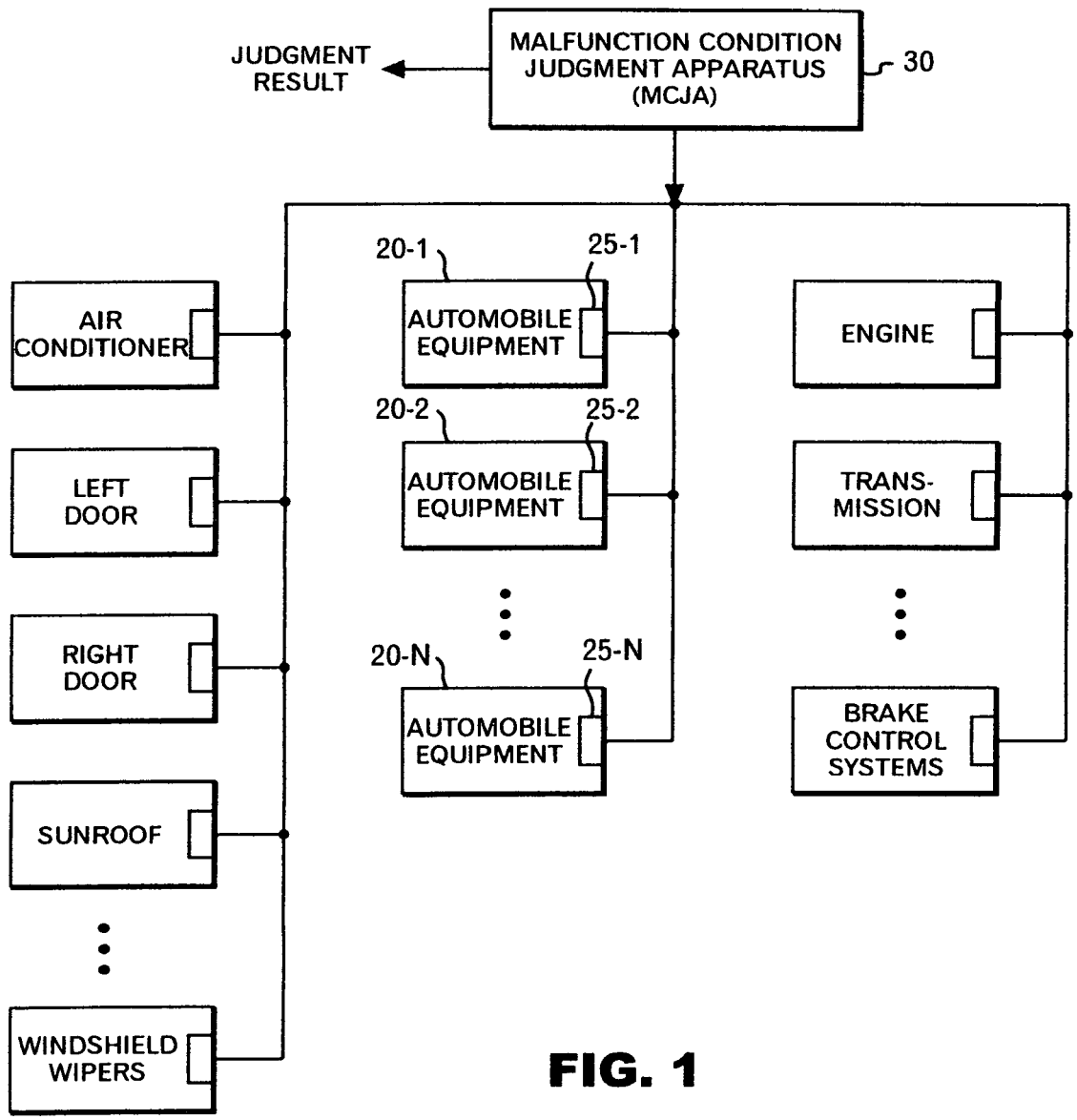
FIG. 1 shows an entire configuration of an automobile 10 (hereinafter A10).

FIG. 1 shows an entire configuration of an A 10. The A 10 is provided with various equipment represented by automobile equipment 20-1 to 20-N, and a MCJA 30. The A 10 includes body-related equipment such as an air conditioner, a left door, a right door, a sunroof and wipers, and chassis-related equipment such as an engine, a gear control and a brake control system and the like. In each one of these equipment, an electrical control unit (ECU) is provided, which includes an observation sensor that observes condition of that equipment.

In this embodiment, the automobile equipment 20-1 to 20-N will be described on behalf of these equipment. The respective automobile equipment 20-1 to 20-N includes ECUs 25-1 to 25-N each corresponding to the above-described ECU. The ECUs are connected to one another through the same bus. Additionally, each of the ECUs 25-1 to 25-N includes an observation sensor which observes the state of respective automobile equipment 20-1 to 20-N, and transmits, to the MCJA 30, observed values obtained by observing that ECUs 25-1 to 25-N. The MCJA 30 is provided so as to be attachable to and detachable from the A 10, and is used when it is attached to the A 10 by an engineer or the like for analyzing MC having occurred in the A 10. The MCJA 30 judges MC based on a change of observed values observed from the A 10, and then outputs a result of the judgment.

"MC" here does not necessarily mean a failure of the A 10, but means a condition different from criterial predetermined condition. Additionally, "observed values" here are, for example, observation results of such a physical phenomenon as a traveling speed, revolutions, a shift position of a shift lever or the like of the A 10. In addition to this, "observed values" may be signal values of a control signal transmitted from one ECU to another ECU, or may be checksum data, which are used for correcting an error in the signal.

Note that the ECUs 25-1 to 25-N may be grouped by a plurality of buses. For example, ECUs 25-1 to 25-N may be grouped into a group of body-related control units and one of chassis-related control unit, and merely those control units in the same group may be connected to a single bus.

A first object of the MCJA 30 according to this embodiment is to speedily and efficiently analyze a cause of MC by appropriately selecting merely data necessary for analyzing the cause of the MC from an enormous amount of observed values obtained every moment from various observation sensors, based on a changing pattern of the observed values.

Figure 2A:
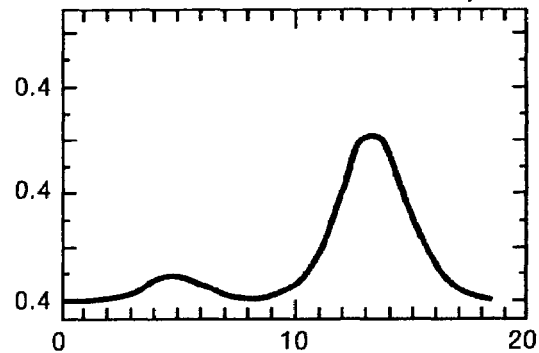
FIGS. 2A to 2D show examples of observed values inputted by a MCJA 30.
Figure 2C:
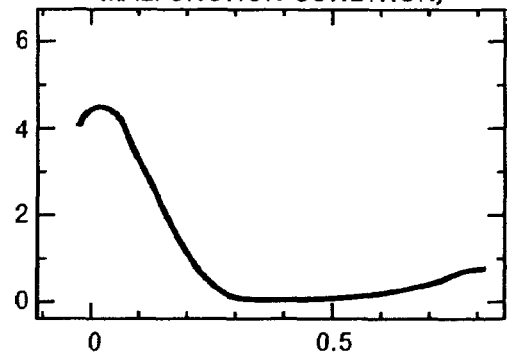
Figure 2B:
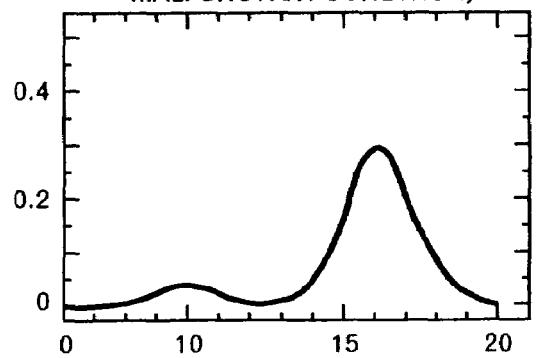

FIGS. 2A to 2D show examples of observed values inputted by the MCJA 30. FIG. 2A shows a probability density distribution of observed values observed by an ECU (represented by, for example, the ECU 25-M) that is not a cause of MC having occurred in the A 10. Additionally, FIG. 2B shows a probability density distribution of observed values observed by the ECU 25-M when MC does not occur.

As has been already described, in a driving test or the like of an automobile, it is difficult to perform a plurality of experiments under exactly the same experimental environment. For example, even when the same instruction is given to a driver of the automobile, there is a subtle dissimilarity between the operations of accelerating and braking. Additionally, temperature and humidity cannot be exactly identical. Accordingly, even when observed values do not indicate MC, time series data of the observed values differ in every experimental test. Therefore, even by comparing the time series data of the observed values, it is often impossible to recognize a significant difference attributable to MC of the automobile.

Meanwhile, as shown in FIGS. 2A and 2B, a probability density function of observed values observed with respect to a portion that is not a cause of MC is substantially identical even between occasions when experimental environments slightly differ from each other.

Figure 2D:
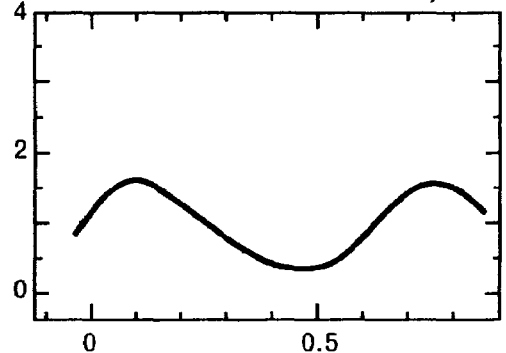

On the other hand, FIG. 2C shows a probability density distribution of observed values observed by an ECU (for example, the ECU 25-L) that is a cause of MC having occurred in the A 10. Additionally, FIG. 2D shows a probability density distribution of observed values observed by the ECU 25-L when MC does not occur. By comparing FIGS. 2C and 2D, a significant difference can be found without the need of performing a quantitative analysis.

As has been described, in many cases, a probability density distribution scarcely changes with a marginal change in experimental environment, but changes only with occurrence of MC. Accordingly, it is considered that a portion that is a cause of MC can be found efficiently by obtaining a probability density function of time series data to analyze the data, not by analyzing the time series data as they are.

However, in order to obtain a probability density function for a certain time period, all of the time series data during that time period are necessary, and therefore, a certain amount of processing time comes to be required after experiments of a driving test and the like of the A 10 are preformed.

Meanwhile, a second object of the MCJA 30 according to this embodiment is to obtain a statistic of an observed value one by one whenever the observed value is acquired in a driving test of the A 10, and immediately judge whether the observed value is necessary for a cause analysis.

Figure 3:
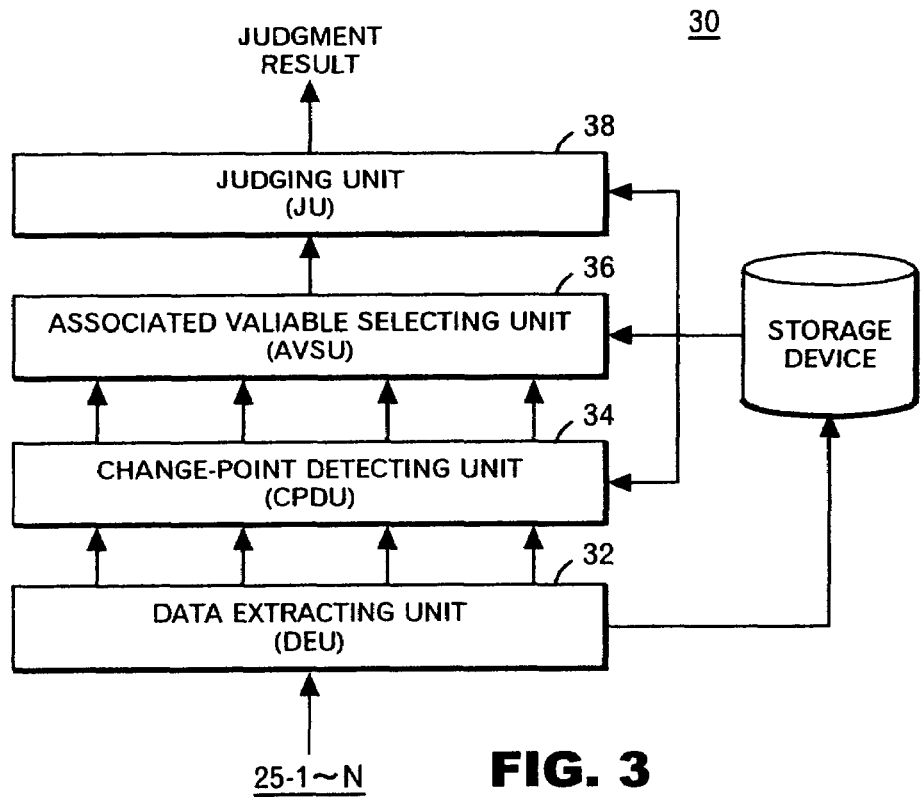
FIG. 3 shows functions of the MCJA 30 by way of functional blocks.

FIG. 3 shows functions of the MCJA 30 by way of functional blocks. The MCJA 30 includes a DEU 32, a change-point detecting unit 34 (hereinafter CPDU 34), an associated variable selecting unit 36 (hereinafter AVSU 36) and a judging unit 38 (hereinafter JU38). The DEU 32 performs data cleansing by which data expected to represent candidates of a cause of MC having occurred in the A 10 are selected among observed values observed from the A 10. Specifically, first, the DEU 32 acquires time series data of values of each of a plurality of variables that has a plurality of observed values observed from the A 10 as a value. For example, the DEU 32 may acquire time series data of each of the variables by monitoring the bus, through which the respective ECUs 25-1 to 25-N are connected to one another, to sequentially acquire observed values stored in communication packets transferred in the bus. Then, after the DEU 32 extracts, out of the variables, a variable that represents a candidate of a cause of MC occurrence, the DEU 32 informs the CPDU 34 of the variable. Furthermore, merely with respect to variables by which MC of the A 10 is detected, the DEU 32 may save time series data of these variables in a storage device.

The CPDU 34, reads time series data of at least one variable out of the picked up variables, for example, after the driving test of the A 10 is over. Then, after detecting a change-point indicating a point of time when a changing pattern of values of the foregoing variable changes, the CPDU 34 transmits a result of the detection to the AVSU 36. Note that the CPDU 34 may additionally detect change-points with respect to other predetermined variables. The AVSU 36 selects a set of variables whose change-points detected by the CPDU 34 are similar to one another. By obtaining degrees of association with which changing patterns of a plurality of variables are associated with one another, the AVSU 36 may select a set of variables whose change-points are similar to one another based on the degrees of association. As an example, the AVSU 36 may obtain degrees of association between the respective variables in accordance with a technology described in Non-patent Document 1.

The JU 38 judges that MC has occurred in portions that are observation objects of observed values held by those variables selected by the AVSU 36. Instead of this, the JU 38 may judge a portion that is a cause of MC, based on whether each of the variables has an abnormal value in comparison with values taken thereby under normal conditions. Specifically, the JU 38 previously stores a probability density distribution of values that can be held by each of the variables under normal conditions. Then, by comparing the stored probability density distribution and a probability density distribution of acquired time series data, the JU 38 judges whether that variable indicates a portion that is a cause of MC. Also by using this judgment, it is possible to appropriately detect a portion that is the cause of the malfunction.

As has been described hereinabove, according to the configuration shown by FIG. 3, the DEU 32 informs the CPDU 34 merely of variables that represent candidates of a cause of MC occurrence. Thereby, it is possible to reduce time required in processing of the CPDU 34, the AVSU 36 and the JU 38. Furthermore, during the driving test, the DEU 32 may store merely time series data of those variables, and discard time series data of the other variables. Thereby, it is possible to reduce a necessary capacity of the storage device installed in the MCJA 30, and consequently, it is possible to reduce a size, an amount of heat generation, power consumption and the like of the MCJA 30.

Figure 4:
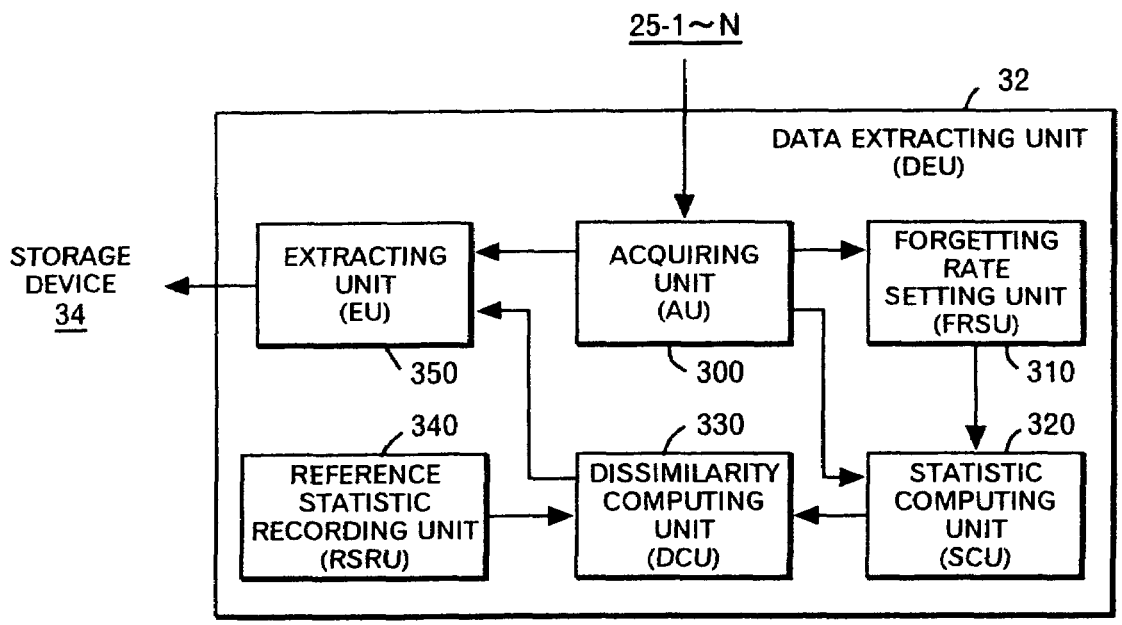
FIG. 4 shows detailed functions of a DEU 32 (hereinafter DEU 32).

FIG. 4 shows detailed functions of the DEU 32. The DEU 32 includes an acquiring unit 300 (hereinafter AU 300), a forgetting rate setting unit 310 (hereinafter FRSU 310), a statistic computing unit 320 (hereinafter SCU 320), a dissimilarity computing unit 330 (DCU 330), a reference statistic recording unit 340 (hereinafter RSRU340), and an extracting unit 350 (hereinafter EU 350). The AU 300 acquires time series data for each of a plurality of variables that has a plurality of observed values observed from the A 10 as a value. Each of a plurality of variables stores, as a variable value, observed values observed with respect to each different portion belonging to a single automobile. Specifically, the AU 300 may acquire time series data of each of the variables by monitoring the bus, through which the respective ECUs 25-1 to 25-N are connected to one another, to sequentially acquire observed values stored in communication packets transferred through the bus.

The FRSU 310 obtains an updating frequency at which each of the variables is updated in a unit time. Moreover, with respect to each of the variables, the FRSU 310 sets a forgetting rate, which is used for calculating a statistic of that variable, in a manner that, when an updating frequency of that variable is higher, the forgetting rate is set lower than when the updating frequency of the variable is lower. The forgetting rate will be described later. Note that the forgetting rate may be set to be a predetermined value with respect to each of the variables regardless of processing of the FRSU 310. The SCU 320 calculates, with respect to each of the variables, a statistic defining a probability density function of that variable at T1 based on the value of that variable at T1 and that statistic at a point of time prior to T1.

In the calculation of the statistic, the forgetting rate set by the FRSU 310 is used. In more detail, when the SCU 320 calculates a statistic defining a probability density function of a certain variable at T1, that statistic at a point of time prior to T1 is multiplied by the forgetting rate that has been set corresponding to that variable by the FRSU 310. Then, the SCU 320 calculates the statistic at T1 based on a value obtained as a result of the multiplication and on an observed value obtained at T1.

The DCU 330 calculates, with respect to each of the variables, dissimilarity showing the extent of variation between a statistic calculated for that variable and a statistic of a criterial probability density function predetermined corresponding to that variable. For example, the RSRU340 records a predetermined statistic corresponding to each of the plurality of variables. So therefore, the DCU 330 may read from the RSRU340 the statistic recorded corresponding to that variable to calculate a difference value between the read statistic and the statistic calculated by the SCU 320 as the dissimilarity.

The EU 350 picks up, out of the plurality of variables, a variable in which the dissimilarity calculated by the RSRU340 is larger than a predetermined reference value, as the variable by which MC of the A 10 is detected. Then, the EU 350 informs the CPDU 34 of the variable. Specifically, the EU 350 selects time series data merely of these variables, and stores them in the storage device. Instead of this, the EU 350 may store time series data merely of variables that represent candidates of a cause of the MC, along with a label, which indicates that intent, attached to the time series data.

Figure 5:
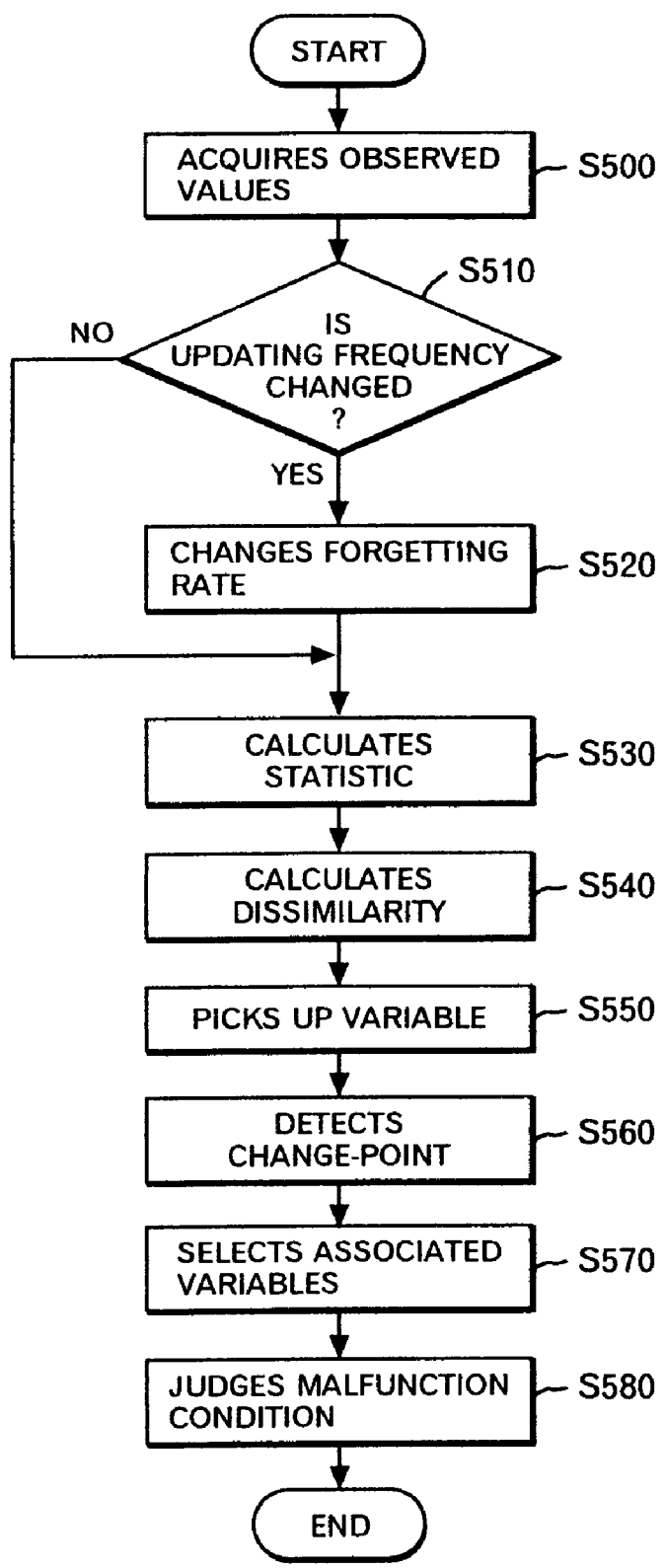
FIG. 5 shows a flowchart of processing by which MC of the A 10 is judged by the MCJA 30.

FIG. 5 shows a flowchart of processing by which MC of the A 10 is judged by the MCJA 30. The MCJA 30 performs processing as follows, for example, at regular intervals. First, the AU 300 monitors the bus through which the respective ECUs 25-1 to 25-N are connected to one another, and thereby acquires observed values stored in communication packets transferred in the bus (S500).

With respect to each of the respective variables, if an updating frequency, at which that variable is updated in a unit time, is changed (Yes in S510), the FRSU 310 obtains a forgetting rate based on the updating frequency after the change, and then sets that forgetting rate in the SCU 320 (S520). Note that the detection of updating frequencies (S510) and the processing of changing the forgetting rate (S520) may not necessarily be performed whenever an observed value is acquired, and may be performed respectively at time intervals different from those in the processing in this drawing, and independently from the processing in this drawing.

The SCU 320 calculates, with respect to each of the variables, a statistic defining a probability density function of that variable at T1 based on the value of that variable at T1 and that statistic at a point of time prior to T1 (S530). Processing of calculating the statistic will be described by taking as an example a case where the statistics are kurtosis and skew of the probability density distribution. First, meanings of the kurtosis and skew will be described.

Kurtosis and Skew

With respect to any continuous distribution f(x) standardized (with a mean 0 and a variance 1), it is known that the Gram-Charlier-Edgeworth expansion expressed by the following equation holds true.

$$f(x) = \phi(x)\left[1 + \frac{\kappa_3}{3!}h_3 + \frac{\kappa_4}{4!}h_4(x) + \dots\right], \quad (1)$$

where: $\kappa_3$ and $\kappa_4$ are a third-order cumulant and a fourth-order cumulant, respectively; $h_3$ and $h_4$ are a third-order Hermitian polynomial and a fourth-order Hermitian polynomial, respectively; and $\phi(x)$ is a standard normal distribution.

As readily known from the equation (1), or more directly from an expanded expression of a cumulant generating function, a cumulant of third or later order is a statistic signifying a deviation from normality. Statistically, characteristics thereof are well researched, and the third-order and fourth-order cumulants have been named respectively as kurtosis and skew. The kurtosis and the skew are, as also presumed based on meanings of these words, tendencies of dissimilarity of a distribution shape of a probability density function with reference to a distribution shape of the standard normal distribution. As an example, the SCU 320 calculates, as statistics for each of the variables, kurtosis and skew of that variable.

Figures 6A, 6B:
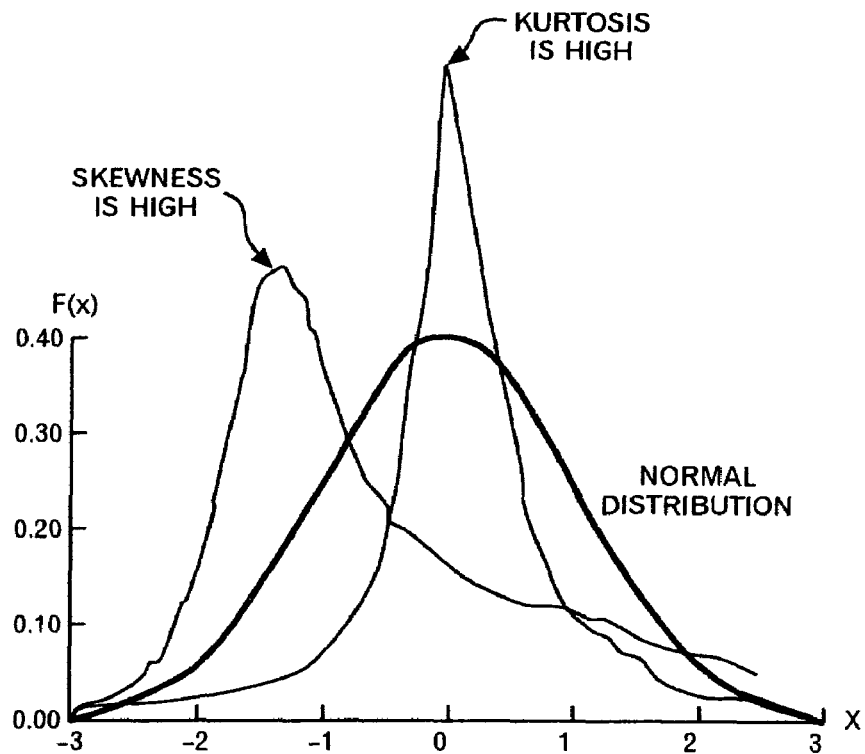
FIGS. 6A and 6B are a chart and a table, respectively, both explaining kurtosis and skew calculated by the MCJA 30.

FIGS. 6A and 6B are a chart and a table, respectively, explaining kurtosis and skew calculated by the MCJA 30. In FIG. 6A, the standard normal distribution is indicated by a thick line, the other two probability density distributions are indicated by thin lines. In one probability density distribution of the other two, a value of x that makes a density value thereof to be maximum differs from a value of such x in the standard normal distribution. This probability density distribution has a higher kurtosis than the standard normal distribution. In the other probability density distribution of the other two, a maximum value thereof is larger than a value of such x in the standard normal distribution. This probability density distribution has a higher skew than the standard normal distribution.

As shown in FIG. 6B, a normal distribution function and a delta function each takes a value 0 as both kurtosis and skew thereof. On the other hand, while a uniform distribution function takes 0 as a skew thereof, it generally takes a value of −6/5 as a kurtosis thereof. Other functions different from these functions each takes non-zero values as both kurtosis and skew thereof.

Hereinafter, by going back to FIG. 5, processing by which kurtosis and skew of a probability density function are calculated will be described.

Method of Calculating Kurtosis and Skew

When an i-th order moment around the origin is denoted as $\mu_i'$, a relation indicated by the following equations (2) holds true with respect to cumulants of fourth and earlier orders.

$$\begin{aligned}\kappa_1 &= \mu_1', \\ \kappa_2 &= \mu_2' - \mu_1'^2, \\ \kappa_3 &= \mu_3' - 3\mu_1'\mu_2' + 2\mu_1'^3, \text{ and} \\ \kappa_4 &= \mu_4' - 4\mu_1'\mu_3' - 3\mu_2'^2 + 12\mu_1'^2\mu_2' - 6\mu_1'^4\end{aligned} \quad (2)$$

In a case where data arrive online, the data cannot be deemed to have been previously standardized. In response, the kurtosis and skew are defined anew by the following equations (3).

$$\begin{aligned}\text{kurtosis} &= \frac{\kappa_3}{(\kappa_2)^{3/2}}, \text{ and} \\ \text{skew} &= \frac{\kappa_4}{(\kappa_2)^2}\end{aligned} \quad (3)$$

Accordingly, as long as the moments of fourth and earlier orders can be calculated, the kurtosis and skew can also be calculated.

In order to derive an online calculating formula for the moments, it is noted that the following identity (4) holds true with respect to any function g(x) of a random variable x.

$$\frac{1}{t}\sum_{s=1}^{t} g(x(s)) = \left(1 - \frac{1}{t}\right) \cdot \frac{1}{t-1} \sum_{s=1}^{t-1} g(x(s)) + \frac{1}{t} g(x(t)), \quad (4)$$

where x(s) indicates a value of the random variable at a time point s. The left side of the identity (4) can be interpreted as a sample mean for data up to a time point t. If the left side is written, for example, as $\langle g \rangle_t$ so as to mean that interpretation, the above identity can be rewritten as:

$$\langle g \rangle_t = (1-\beta) \cdot \langle g \rangle_{t-1} + \beta g(x(t)), \quad (5)$$

where 1/t is replaced by β. Here, if 1/β is reinterpreted as a parameter expressing a time scale given attention to, the above equation can be interpreted as an online updating formula of an expectation for the random function g. That is, moments around the origin at the time point t can be calculated as:

$$\mu_n'(t) = (1-\beta)\mu_n'(t-1) + \beta x(t)^n \ (n=1, 2, 3, \text{ and } 4). \quad (6)$$

This β is a forgetting rate set by the above-described FRSU 310. The forgetting rate takes a positive value less than 1.

In summary, the SCU 320 ends up calculating kurtosis and skew at a certain time point t in processes described below.

1. Feed an initial value x(0).
2. Calculate the first- to fourth-order moments at the time point t by using the equation (6). In processing of this calculation, moments $\mu_i'(t-1)$ at a time point (t−1) prior to the time point t are used.
3. Calculate the first- to fourth-order cumulants at the time point t by using the equations (2).
4. Calculate the skew and kurtosis by using the defining formulae (3).

Note that, although the SCU 320 calculates the first- to fourth-order moments and additionally calculates the first- to fourth-order cumulants in this embodiment, cumulants calculated by the SCU 320 are not limited to those of the fourth and earlier orders. For example, the SCU 320 may calculate each of cumulants of the fifth and later orders as a statistic indicating a probability density distribution of each of the variables. As a method of calculating the cumulants of the fifth and later orders, the SCU 320 can calculate each of moments of the fifth and later orders by setting n to be each of values of 5 and above in the equation (6), and can further calculate each of the cumulants based on those moments.

Next, the DCU 330 calculates, with respect to each of the variables, dissimilarity showing the extent of variation between a cumulant calculated with respect to that variable and a cumulant of a criterial probability density function predetermined corresponding to that variable (S540). For example, the RSRU340 records a criterial kurtosis and a criterial skew both predetermined corresponding to each of the plurality of variables. So therefore, the DCU 330 may read from the RSRU340 the kurtosis and skew both recorded corresponding to each of the plurality of variables, and calculate, as the dissimilarity, the extent of variation (difference values) between the read kurtosis and the kurtosis calculated by the SCU 320, and between the read skew and the skew calculated by the SCU 320.

The EU 350 picks up, out of the plurality of variables, a variable in which the dissimilarity calculated by the RSRU 340 is larger than a predetermined reference value, as the variable by which MC of the A 10 is detected (S550). Next, the CPDU34 detects a point of time when a changing pattern of values of at least one of the picked up variables changes (S560). Note that the CPDU 34 may additionally detect change-points with respect to still other variables. The AVSU 36 selects a set of variables whose change-points detected by the CPDU 34 are similar to one another (S570). Thereafter, the JU 38 judges the set of variables selected by CPDU 34 to be a set of variables that indicates a portion that is the cause of the MC, and outputs a result of the judgment.

Figure 7A:
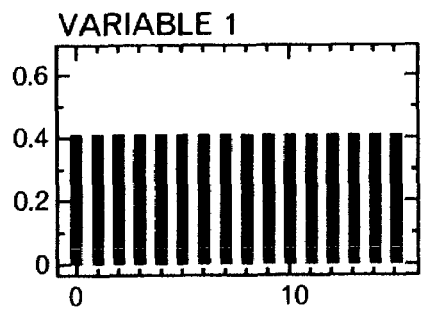
FIGS. 7A to 7H show probability density distributions of time series data actually obtained in a certain experiment.
Figure 7E:
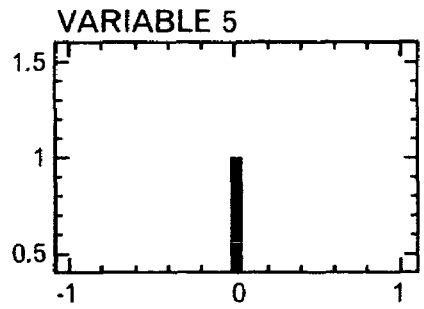
Figure 7B:
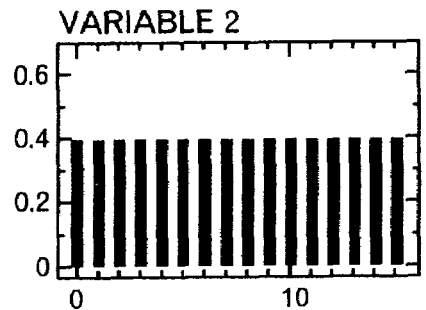
Figure 7F:
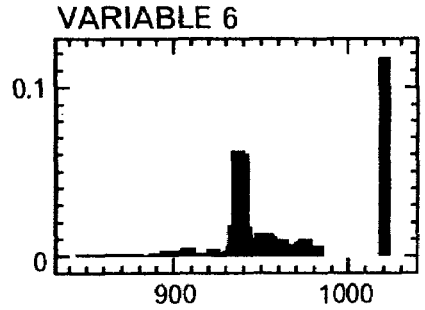
Figure 7C:
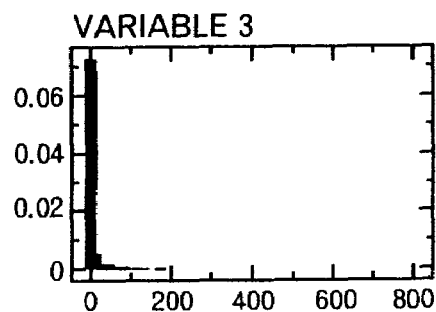
Figure 7G:
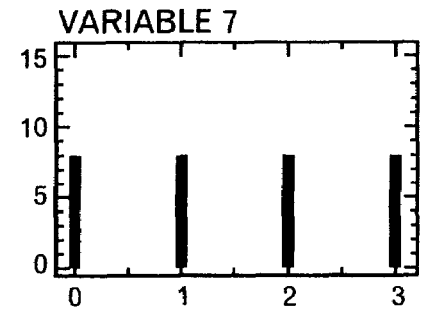
Figure 7D:
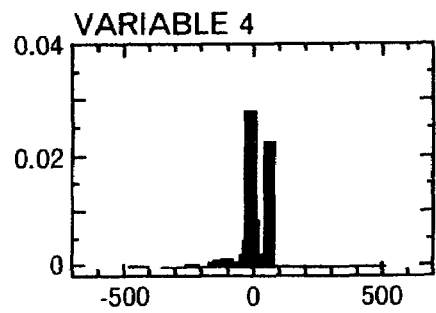
Figure 7H:
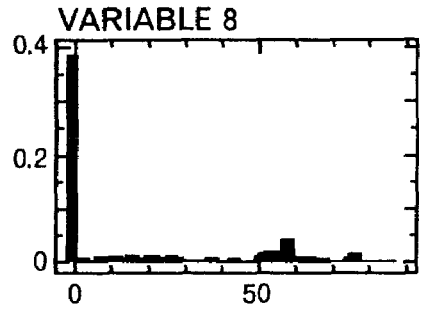

FIGS. 7A to 7H show probability density distributions of time series data actually obtained in a certain experiment. In more detail, FIGS. 7A to 7H are probability density distributions of observed values obtained from the respective ECUs 25-1 to 25-8 shown in FIG. 1. As shown in these drawings, the observed values obtained from communication packets transferred through the CAN show not only a distribution similar to a normal distribution as seen in a case of observed values with respect to a physical phenomenon, but also various distributions such as a discrete uniform distribution, a distribution indicating a constant function and the like. For example, as shown in FIG. 7E, the variable 5 has a distribution of a constant function. Additionally, as shown in FIGS. 7F and 7H, the variables 6 and 8 show distributions similar to a normal distribution if some values thereof are excluded. From this information, it can be considered that each of the ECUs 25-6 and 25-8 observed a physical phenomenon (for example, a speed of the automobile, revolutions, or the like).

On the other hand, as shown in FIGS. 7a, 7b and 7g, each of variables 1, 2 and 7 forms a discrete uniform distribution. From this information, it can be considered that each of the ECUs 25-1, 25-2 and 25-7 did not observe a physical phenomenon, but observed a control signal or the like. For example, it is considered highly possible that each of the ECUs 25-1, 25-2 and 25-7 was transmitting a control signal to another ECU.

However, observed values shown in FIG. 7a show a distribution dissimilar from a complete discrete uniform distribution. It is known that a dissimilarity of this kind occurs because of retransmission of a lost or not yet arrived communication packet storing an observed value. It is known that a probability density function changes not only as a result of this example, but also as a result of slight dissimilarity in experimental environment. In the case where a probability density function changes as a result of slight dissimilarity in experimental environment, it is difficult to accurately detect a discrete uniform function by a simple condition judgment (for example, a condition where frequencies of occurrence of an observed value 10 and an observed value 11 are equal to each other).

Meanwhile, based on statistics of probability density distributions of observed values, the MCJA 30 shown in this embodiment detects a variable that represents a cause of MC having occurred in an observation object of that variable. That is, for example, with respect to each of the variables, the DCU 330 calculates, as the dissimilarity, difference values of kurtosis and skew calculated by the SCU 320 respectively from kurtosis and skew of a criterial probability density function predetermined corresponding to that variable. Then, the EU 350 picks up a variable, in which at least any one of the difference values in kurtosis and in skew calculated by the DCU 330 is larger than a predetermined criterion therefor, as the variable by which MC of the automobile is detected. Accordingly, the variable 1 shown in FIG. 7A has a slight statistic difference with a discrete uniform distribution, and therefore is not picked up as the variable by which MC of the automobile is detected.

A more detailed example of the processing will be described. The RSRU 340 records kurtosis and skew of a discrete uniform distribution function in a manner that the kurtosis and skew correspond to the variable 1 that has observation values of the ECU 25-1. That is, it is known, by previously obtained design information, or based on observation values obtained by observing the automobile in normal condition, that the ECU 25-1 obtains observation values forming the discrete uniform distribution. Accordingly, the RSRU340 records a kurtosis −6/5 of the discrete uniform distribution in a manner that the kurtosis corresponds to the variable 1. Additionally, the RSRU340 records a skew 0 of the discrete uniform distribution in a manner that the skew corresponds to the variable 1.

Incidentally, it is known that a kurtosis of a discrete uniform distribution becomes $-(6/5)\times(n^2+1/n^2-1)$ where n is the number of values possible to be taken by the observation values forming that distribution. If a number of values possible to be taken by the variable 1 is 12, the kurtosis of the variables 1 is $-(6/5)\times(12^2+1/12^2-1)$. Accordingly, with respect to each of the variables that have discrete uniform distributions, the RSRU 340 may record, instead of −6/5 that is an approximate value of the kurtosis of the discrete uniform distribution, an exact kurtosis based on the number of values possible to be taken by that variable, in a manner that the exact kurtosis corresponds to that variable.

With respect to the variable 1, the DCU 330 calculates, as dissimilarity, difference values of kurtosis and skew calculated by the SCU 320 respectively from kurtosis and skew in the discrete uniform distribution function. Then, the EU 350 picks up a variable in which at least any one of the difference values of the kurtosis and skew calculated by the DCU 330 is larger than a predetermined criterion therefor. Based on the above processing, conditions by which a certain variable is judged to have a discrete uniform distribution can be summarized as follows.

$$|\kappa_3| < \varepsilon_1, \quad \text{and} \tag{7}$$
$$-\frac{6}{5} - \varepsilon_2 < \kappa_4 < -\frac{6}{5} + \varepsilon_3,$$

wherein $\varepsilon_1$ and $\varepsilon_2$ are predetermined criteria corresponding to kurtosis and skew therefor, respectively. According to the above judgment conditions, it is possible to appropriately judge MC having occurred in, for example, an ECU originally supposed to transmit various control signals.

Likewise, with respect to a case where values of a certain variable has a normal distribution, an example of judgment on whether that variable indicates MC of the automobile will be described.

The RSRU340 records kurtosis and skew of a normal distribution function in a manner that the kurtosis and skew correspond to the variable 6, the values of which are observation values of the ECU 25-6. That is, it is known, by previously-obtained design information, or based on observation values obtained by observing the automobile in normal condition, that the ECU 25-6 obtains observation values forming the normal distribution. Accordingly, the RSRU340 records 0 as a kurtosis of the normal distribution and 0 as a skew of the normal distribution in a manner that the kurtosis and skew correspond to the variable 6.

With respect to the variable 6, the DCU 330 calculates difference values of the kurtosis and skew calculated by the SCU 320 respectively from the kurtosis and the skew in the normal distribution function, as dissimilarity. Then, the EU 350 picks up a variable in which at least any one of the difference values in kurtosis and in skew calculated by the DCU 330 is larger than a predetermined criterion. Based on the above processing, conditions by which a certain variable is judged to have a normal distribution can be summarized as follows.

$$|\kappa_3| < \varepsilon_1, \text{ and}$$

$$|\kappa_4| < \varepsilon_2. \tag{8}$$

According to the above judgment conditions, it is possible to appropriately judge, for example, an ECU observing a portion where MC has occurred.

Likewise, with respect to a case where a certain variable has a constant function, an example of judgment on whether that variable indicates MC of the automobile will be described.

The SCU 320 calculates a second-order cumulant with respect to the variable 5. The second order cumulant is a variance, and it is known that a variance of a constant function is 0. Therefore, the RSRU340 records a variance 0 of the constant function in a manner that the variance 0 corresponds to the variable 5 having observation values of the ECU 25-5. With respect to the variable 5, the DCU 330 calculates a difference value of the second-order cumulant calculated by the SCU 320 from the variance of the constant function, as dissimilarity. Then, the EU 350 picks up a variable in which a difference value of the variance calculated by the DCU 330 is larger than a predetermined criterion. Thereby, when abnormality has occurred in observed values obtained from the automobile equipment 20-5, it is possible to extract the variable 5 to allow it to serve in fault diagnosis.

As has been described hereinabove, the MCJA 30 of this embodiment calculates a statistic of an observed value whenever an observed value is acquired, and based on dissimilarity of the statistic, judges a candidate of a cause of MC. Thereby, the MCJA 30 can judge the cause of the MC, stably, in real time and accurately, regardless of a slight difference in observation environment.

According to the present invention, various applications can be made possible in addition to the above embodiment. Hereinafter, two variations thereof will be presented.

(1) Classification of Variables

As has been already described, design information of an automobile has high confidentiality, and therefore, is often difficult to be obtained even when that is used for MC detection of the automobile. Therefore, in some cases, it is impossible to previously recognize whether each of the observed values indicates a physical phenomenon or a control signal of the automobile. For this reason, in some cases, regardless of whether MC has occurred or has not occurred, it is desirable that each of the variables be classified by type thereof preferably by using an automobile in normal condition. By applying the MCJA 30 of this embodiment, the classification of this kind also becomes possible.

Specifically, first, as in the case with the above-described embodiment, the AU 300 acquires time series data of each of the variables by using an automobile in normal condition. Then, the SCU 320 calculates, with respect to each of the variables, a statistic defining a probability density function of that variable at T1 based on the value of that variable at T1 and that statistic at a point of time prior to T1. The MCJA 30 judges whether a static calculated with respect to each of the variables approximates to a statistic acquired when the probability density distribution of that variable is a normal distribution. For example, if kurtosis and skew calculated with respect to a certain variable of the respective variables have both values within ranges predetermined on the basis of a kurtosis and a skew of the normal distribution as criteria, the MCJA 30 may judge that the certain variable has observed values of a physical phenomenon as variable values thereof. Judgment in a case of a discrete uniform distribution can be performed in a manner similar to this.

(2) MC Detection with Objects Other than Automobile

The MCJA 30 in this embodiment is effective particularly in a case where it is impossible to perform observation a plurality of times in a totally identical environment. For example, the MCJA 30 may be provided in an examination apparatus operable to examine an individual human being, an individual animal or the like, and may be used for diagnosing MC having occurred in that individual. In this case, each of a plurality of variables stores observed values observed from each different portion of an individual that is the object of diagnosis. Then, the EU 350 picks up, out of the plurality of variables, a variable in which dissimilarity calculated by the DCU 330 is larger than a predetermined reference value, as the value by which MC of the individual is detected. In this manner, the MCJA 30 can be applied also to various objects from which observed value are available other than automobiles.

Figure 8:
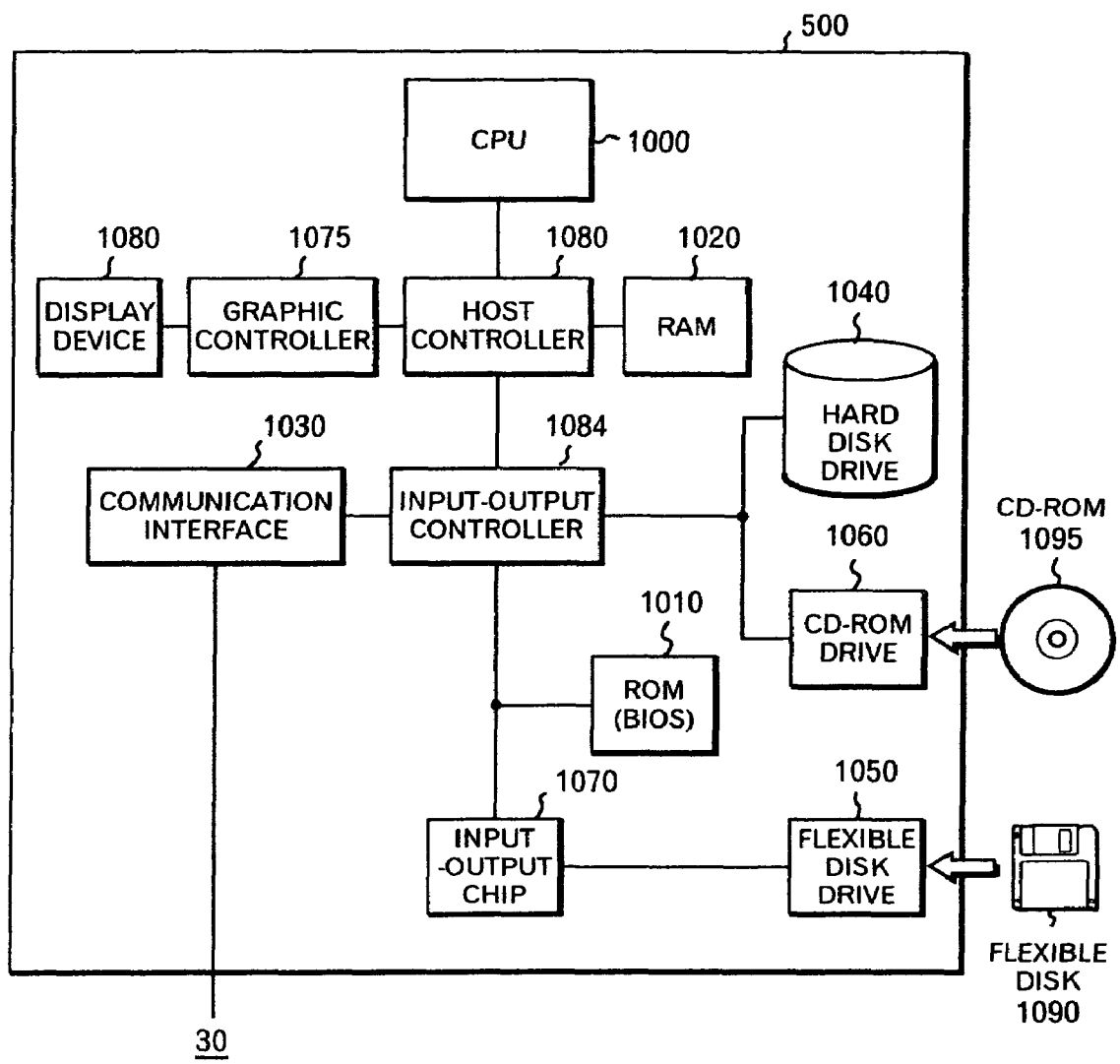
FIG. 8 shows an example of a hardware configuration of an information processing apparatus 500 (hereinafter IPA 500) that supplies a program to the MCJA 30.

FIG. 8 shows an example of a hardware configuration of an IPA 500 that supplies a program to the MCJA 30. The IPA 500 is provided with: a CPU peripheral section including a CPU 1000, a RAM 1020 and a graphic controller 1075, all connected to one another by a host controller 1082; an input-output section including a communication interface 1030, a hard disk drive 1040 and a CD-ROM drive 1060, all connected to the host controller 1082 by an input-output controller 1084; and a legacy input-output section including a ROM 1010, a flexible disk drive 1050 and an input-output chip 1070, all connected to the input-output controller 1084.

The host controller 1082 connects the RAM 1020 to the CPU 1000 and the graphic controller 1075 both of which accesses the ROM 1020 at a high data transmission rate. The CPU 1000 operates based on programs stored in the ROM 1010 and the RAM 1020, to control each unit of the IPA 500. The graphic controller 1075 acquires picture data generated by the CPU 1000 or the like on a frame buffer provided in the RAM 1020, and displays the picture data on a display device 1080. Instead of this configuration, the graphic controller 1075 may include in itself the frame buffer storing the picture data generated by the CPU 1000 or the like.

The input-output controller 1084 connects the host controller 1082 to the communication interface 1030, the hard disk drive 1040 and the CD-ROM drive 1060 that are relatively high-speed input-output devices. The communication interface 1030 communicates with an external apparatus through a network. The hard disk drive 1040 stores programs and data used by the IPA 500. The CD-ROM drive 1060 reads a program or data from a CD-ROM 1095, and supplies the program or the data to the RAM 1020 or the hard disk drive 1040.

Additionally, relatively low-speed input-output devices such as the ROM 1010, the flexible disk drive 1050 and the input-output chip 1070 are connected to the input-output controller 1084. The ROM 1010 stores programs such as a boot program executed by the CPU 1000 upon start-up of the IPA 500, and a program dependent on hardware of the IPA 500. The flexible disk drive 1050 reads a program or data from a flexible disk 1090, and supplies the program or the data to the RAM 1020 or the hard disk drive 1040 through the input-output chip 1070. The input-output chip 1070 connects various input-output devices to the IPA 500 through the flexible disk 1090, and for example, through a parallel port, a serial port, a key board port, a mouse port and the like.

Each program supplied to the IPA 500 is stored in a recoding medium such as the flexible disk 1090, the CD-ROM 1095, an IC card or the like, and then, is supplied by a user of the MCJA 30. That program is read from the recording medium through at least any one of the input-output chip 1070 and the input-output controller 1084, and then, is installed into the IPA 500 to be executed. Because operations which the programs cause the MCJA 30 to execute are the same as those described in FIGS. 1 to 7H, descriptions thereof will be omitted.

The programs described above may be stored in an external recording medium. As a recording medium, an optical recording medium such as a DVD or a PD, a magneto-optical recording medium such as an MD, a tape medium, a semiconductor memory such as an IC card may be used other than the flexible disk 1090 and the CD-ROM 1095. A recording device such as a hard disk or a RAM provided on a server system connected to a dedicated communication network or to the Internet may be used as a recording medium, whereby a program is supplied to IPA 500 via the network.

Although the present invention has been described hereinabove by using the embodiment, a technical scope of the present invention is not limited to a scope described in the above embodiment. It will be apparent to those skilled in the art that it is possible to add various alterations or modifications to the above embodiment. It is apparent from description in the scope of claim that modes to which such alterations or modifications are added can be included in the technical scope of the present invention.

According to the present invention, it becomes possible to appropriately select, out of the plurality of observed values obtained from the observation object, an observed value indicating a MC having occurred in the observation object.

Although the preferred embodiment of the present invention has been described in detail, it should be understood that various changes, substitutions and alternations can be made therein without departing from the spirit and scope of the inventions as defined by the appended claims.

What is claimed is:

1. A control method of a malfunction condition judgment apparatus that judges a malfunction condition of an observed object based on a change of observed values observed from the observation object, comprising the steps of:

acquiring time series data for values of each of a plurality of variables that has a plurality of observed values observed from the observation object as a value;

calculating, with respect to each of the variables, a statistic defining a probability density function of that variable at a point of time (T1), by adding into a value where the statistic at the prior time to T1 is subtracted by a value obtained by multiplying a forgetting rate set corresponding to the variable at the prior time to said point of time, a value where a value of the variable at T1 is multiplied by said forgetting rate;

calculating, with respect to each of the variables, dissimilarity showing an extent of variation between the statistic calculated for that variable and a statistic of a criterial probability density function predetermined corresponding to that variable;

pick up, out of the plurality of variables, a variable in which the calculated dissimilarity is larger than a predetermined reference value, as the variable by which a malfunction condition of the observed object is detected; and setting a forgetting rate with respect to each of the variables in a manner that, in a case where an updating frequency at which that variable is updated in a unit time is higher, the forgetting rate is set lower than in a case where the updating frequency is lower.

* * * * *